United States Patent
Chou et al.

(10) Patent No.: US 6,179,355 B1
(45) Date of Patent: Jan. 30, 2001

(54) AUTOMOTIVE VEHICLE BUMPER ASSEMBLY

(75) Inventors: Shui-Fang Chou, Troy; Yi Qu, Madison Hts.; Han C. Wang, Ann Arbor, all of MI (US)

(73) Assignee: Ford Global Technologies, Inc., Dearborn, MI (US)

(*) Notice: Under 35 U.S.C. 154(b), the term of this patent shall be extended for 0 days.

(21) Appl. No.: 09/215,939

(22) Filed: Dec. 18, 1998

(51) Int. Cl.[7] ................................................. B60R 19/26
(52) U.S. Cl. .................... 293/132; 293/133; 293/120; 293/121; 188/377
(58) Field of Search ................... 293/133, 132, 293/120, 102, 121; 188/377

(56) References Cited

U.S. PATENT DOCUMENTS

| | | | |
|---|---|---|---|
| 3,412,628 | * 11/1968 | Gain | 188/377 |
| 3,495,474 | * 2/1970 | Nishimura et al. | 293/133 |
| 3,819,224 | * 6/1974 | Casey et al. | 188/377 |
| 3,831,997 | 8/1974 | Myers . | |
| 3,897,095 | 7/1975 | Glance et al. . | |
| 3,912,295 | * 10/1975 | Eggert, Jr. | 293/133 |
| 3,938,841 | 2/1976 | Glance et al. . | |
| 3,997,207 | 12/1976 | Norlin . | |
| 3,998,485 | * 12/1976 | Putter et al. | 188/377 |
| 4,023,652 | * 5/1977 | Torke | 188/377 |
| 4,190,276 | * 2/1980 | Horano et al. | 293/133 |
| 4,272,114 | * 6/1981 | Hirano et al. | 293/133 |
| 4,465,312 | * 8/1984 | Werner | 293/133 |
| 4,468,052 | 8/1984 | Koike . | |
| 4,829,979 | * 5/1989 | Moir | 188/377 |
| 4,901,486 | * 2/1990 | Kobori et al. | 188/377 |
| 5,116,092 | * 5/1992 | Schonleber | 293/133 |
| 5,201,912 | * 4/1993 | Terada et al. | 293/133 |
| 5,273,330 | * 12/1993 | Petry et al. | 293/133 |
| 5,314,229 | * 5/1994 | Matuzawa et al. | 188/377 |
| 5,419,416 | * 5/1995 | Miyashita et al. | 188/377 |
| 5,431,445 | * 7/1995 | Wheatley | 188/377 |
| 5,732,801 | * 3/1998 | Gertz | 188/377 |
| 5,785,367 | 7/1998 | Baumann et al. . | |
| 5,803,514 | * 9/1998 | Shibuya et al. | 293/133 |
| 5,876,078 | * 3/1999 | Miskech et al. | 293/133 |

FOREIGN PATENT DOCUMENTS

| | | |
|---|---|---|
| 21 37 517 | 2/1973 | (DE) . |
| 2307665 | 4/1997 | (GB) . |

* cited by examiner

Primary Examiner—Joseph D. Pape
Assistant Examiner—Kiran Patel
(74) Attorney, Agent, or Firm—David B. Kelley

(57) ABSTRACT

A bumper assembly for an automotive vehicle has a pair of multi-stage crush caps attached to longitudinal ends of generally parallel vehicle body support members, each of the crush caps having an outward facing impact surface. A bumper member is attached to the body support members so as to extend generally laterally therebetween encasing the pair of crush caps and has an upper crush groove, a lower crush groove, and an outward facing crush groove, all extending laterally along the bumper member. The outward facing crush groove has an inner crush initiating surface spaced a predetermined distance from and substantially parallel to the impact surface of each of the crush caps. A bumper fascia is mounted over the bumper member to provide an aesthetic exterior appearance.

19 Claims, 3 Drawing Sheets

AUTOMOTIVE VEHICLE BUMPER ASSEMBLY

FIELD OF THE INVENTION

The present invention relates to automotive vehicle bumpers in general, and more specifically to energy absorbing bumpers.

DISCUSSION OF THE PRIOR ART

It is known in the automotive industry to provide a bumper on the front and rear of an automotive vehicle to absorb impact energy and to prevent damage to other vehicle components such as fenders, frames, and the like. Some bumper designs seek to provide efficient energy absorption at low vehicle speeds such as that shown in U.S. Pat. No. 5,785,367 (Baumann et al). Baumann forms a bumper from two half shells of U-shaped cross section which terminate in longitudinally extending collapsible sections located adjacent the vehicle frame members. The collapsible sections, or deformation members, absorb energy when the ability of the bumper bracket to deform is exhausted.

Other bumper designs are oriented at absorbing energy in high-speed impacts. One such design, as shown in U.S. Pat. No. 3,831,997 (Myers), locates two series connected energy-absorbing sections at the front end of the vehicle frame. The collapse of the vehicle front end is controlled by a laterally corrugated loop extending from the front end of the vehicle frame structure toward the rear end of the engine compartment. In U.S. Pat. No. 5,201,912 (Terada et al), a high-speed bumper design is shown in which the bumper is formed by a resin which encases a foam. Tubular collapsible members are located between the bumper and the ends of the vehicle frame.

Another design for attenuating front and rear impact energy is shown in U.S. Pat. No. 3,912,295 (Eggert, Jr.). Eggert shows plural stages or modes of low-energy-attenuation, and high-energy-attenuation. This design, and other previous bumper designs, do not provide, however, adequate controlled energy absorption over a range of impact speeds.

SUMMARY OF THE INVENTION

The present invention provides a bumper assembly for an automotive vehicle which is capable of effectively absorbing impact energy under various impact conditions. The bumper assembly comprises a pair of multi-stage crush caps adapted for attachment to longitudinal ends of the vehicle body support members, such as frame rails, with each of the crush caps having an outward facing impact surface. The bumper member is adapted for attachment to the pair of body support members to extend generally laterally therebetween encasing the pair of crush caps. The bumper member has an upper crush groove, a lower crush groove, and an outward facing crush groove, which serve to absorb energy in a controlled, predetermined manner. The bumper member also has an inner, crush initiating surface spaced a predetermined distance from and substantially parallel to the impact surface of each of the pair of crush caps. A bumper fascia is preferably adapted to be mounted over the bumper member.

During an impact condition, the upper and lower crush grooves of the bumper member deform when the bumper assembly is impacted by a force below a first predetermined impact level and the crush initiating surface of the bumper member moves toward the outward facing impact surface of at least one of the pair of crush caps, but does not deform it. A first level of controlled energy absorption is thus provided by the deformation of the upper and lower crush grooves. When the bumper assembly is impacted by a force between the first predetermined impact level and a second predetermined impact level, the upper and lower crush grooves deform and the crush initiating surface of the bumper member contacts the outward facing impact surface of at least one of the pair of crush caps thus deforming the crush cap and the upper and lower crush grooves so as to provide a second level of controlled energy absorption. When the bumper assembly is impacted by a force above the second predetermined impact level, the upper and lower crush grooves deform, the crush initiating surface of the bumper member contacts the outward facing impact surface of at least one of the pair of crush caps deforming it, and the outward facing wall of the bumper member deforms about the outer crush groove to further deform the crush cap so as to provide a third level of controlled energy absorption.

An advantage of the present invention is a bumper assembly for an automotive vehicle, which is capable of effectively absorbing impact energy under various impact conditions.

Another advantage of the present invention is a bumper assembly which is cost effective and easy to manufacture and assemble.

A feature of the present invention is a bumper assembly having a bumper member with outer, upper, and lower crush grooves.

Another feature of the present invention is a bumper assembly having a multi-stage crush cap.

Still another feature of the present invention is a bumper assembly which deforms in a controlled fashion to effectively absorb energy at predetermined impact levels.

DETAILED DESCRIPTION OF THE PREFERRED EMBODIMENTS

Figure 1A:
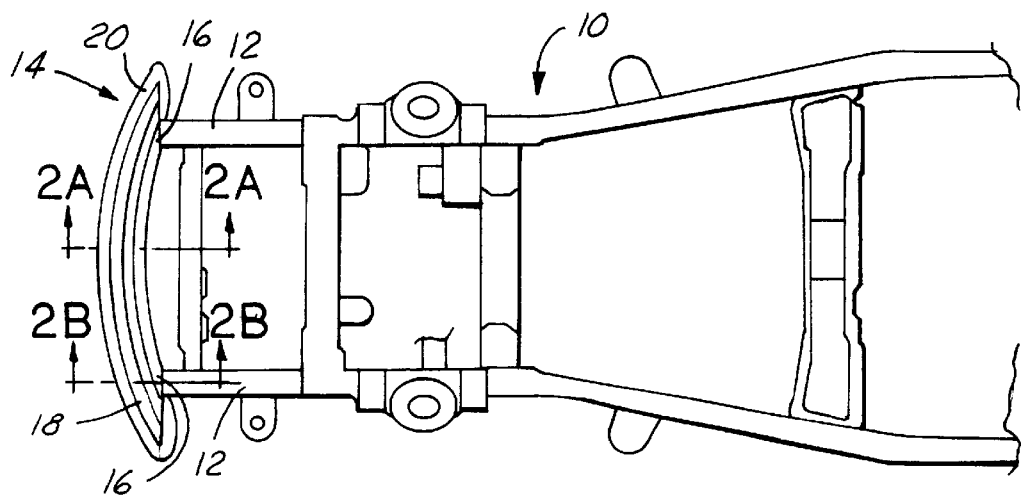
FIG. 1A is a plan view of an automotive vehicle frame having a bumper assembly according to the present invention attached thereto.
Figure 1B:
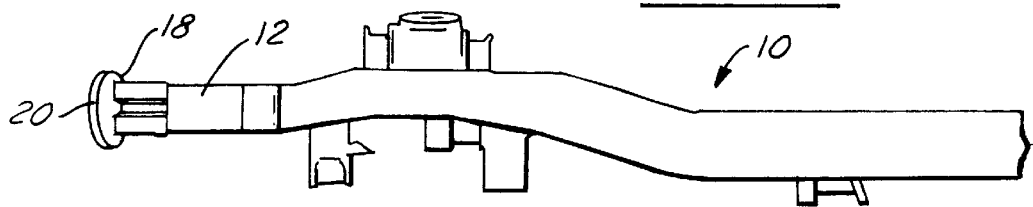
FIG. 1B is a side view of FIG. 1A.
Figure 2A:
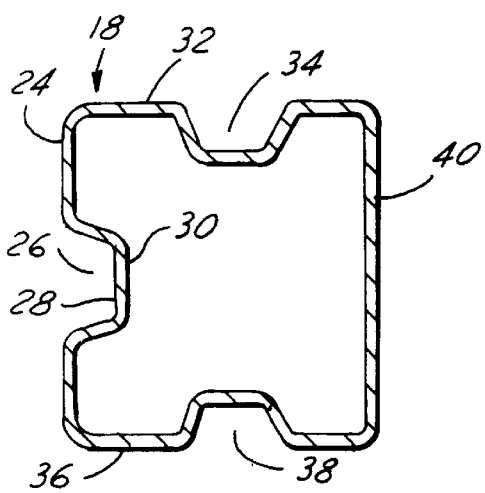
FIG. 2A is a cross-sectional view taken along line 2A—2A of FIG. 1A.
Figure 2B:
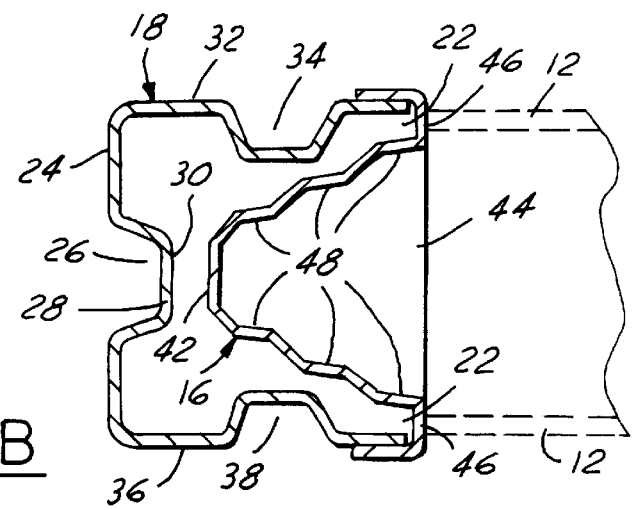
FIG. 2B is a cross-sectional view taken along line 2B—2B of FIG. 1A.
Figure 3:
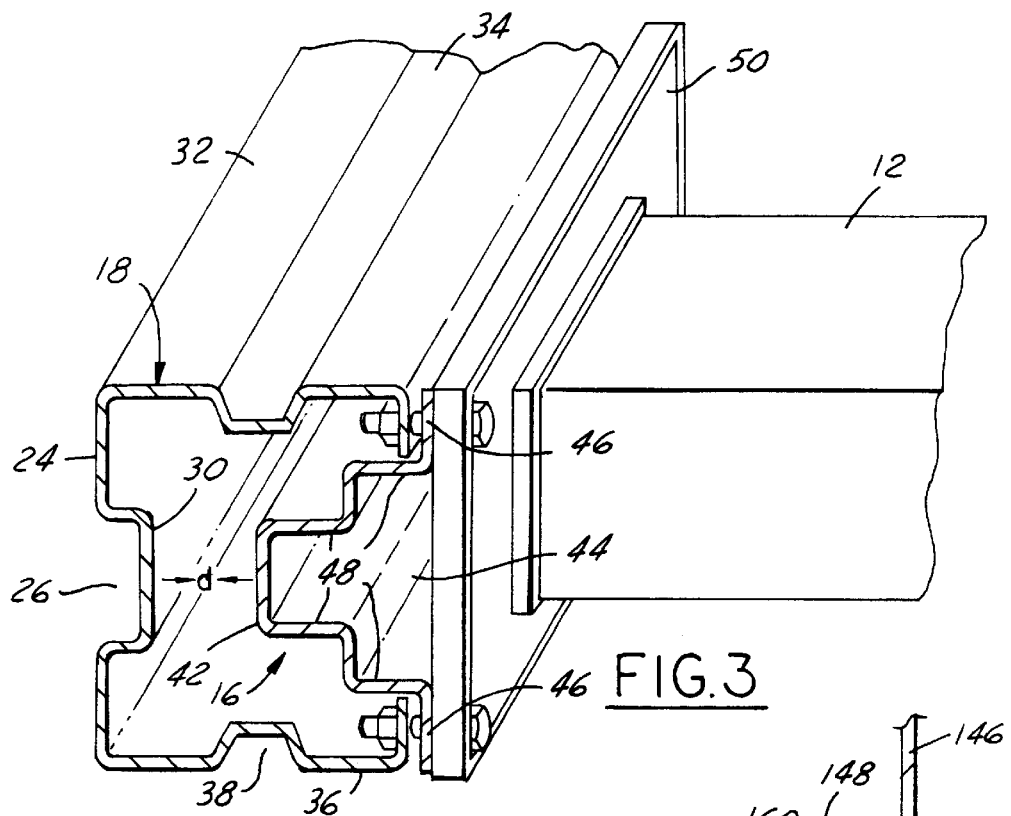
FIG. 3 is a perspective, partially cut-away view of a bumper assembly according to the present invention shown without the bumper fascia.
Figure 4A:
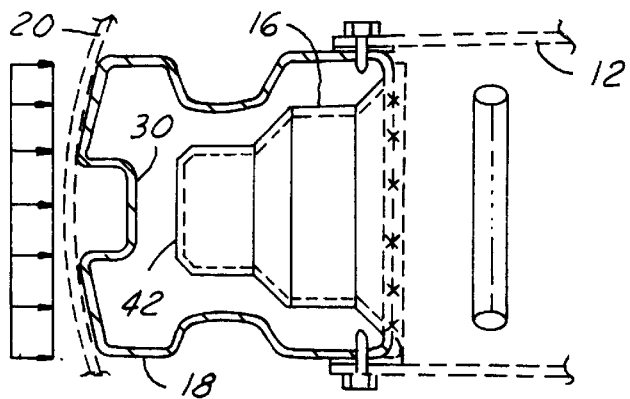
FIGS. 4A–4D show side cross-sectional views of a bumper assembly according to the present invention before an impact, after an impact of a first energy level, after an impact of a second energy level, and after an impact of a third energy level, respectively.

Turning now to the drawings and in particular to FIGS. 1A and 1B thereof, an automotive vehicle frame 10 is shown having a pair of generally parallel, longitudinal extending vehicle body support members 12, which may be, for example, vehicle frame rails. Those skilled in the art will understand that in a unibody construction there are no frame rails, but body support members, which perform a similar function (not shown). A bumper assembly, generally shown at 14, is adapted for attachment to longitudinal ends of the support members 12 as further described below. The bumper assembly 14 comprises a pair of multi-stage crush caps 16 attached to longitudinal ends of the body support members 12. A bumper member 18 is also attached to the pair of body support members 12 so as to extend generally laterally therebetween encasing the pair of crush caps therein, as shown in FIGS. 2A, 2B, and 3. The bumper assembly 14 also has a bumper fascia 20 adapted to be mounted over the bumper member as seen in FIGS. 1A and 4A.

As seen in FIG. 2A, the bumper member 18 is preferably a hollow beam having a closed cross-section with a pair of inward facing openings 22 (only one shown) adapted to be generally aligned with the body support members 12 for receiving the crush caps 16 therein (FIGS. 2B and 3). The bumper member 18 has an outward facing wall 24 with an outer crush groove 26 extending laterally generally along the bumper member 18, a portion 28 of the outer crush groove having an inner crush initiating surface 30. The bumper member 18 also has an upper wall 32 with a generally laterally extending upper crush groove 34, a lower wall 36 with a generally laterally extending lower crush groove 38, and an inward facing wall 40 (FIG. 2A).

Each of the pair of crush caps 16 has an outward facing impact surface 42 (FIGS. 2B and 3) spaced a predetermined distance, b, from and substantially parallel to the inner crush initiating surface of the bumper member 18 (FIG. 3). Each of the crush caps 16 also has an open end 44 with an attachment flange 46 extending therefrom which can close the opening 22 of the bumper member 18 (FIGS. 2B and 3). To facilitate the energy absorbing crush cap 16 in combination with the bumper member 18, each of the crush caps 16 has a plurality of stepped crush sections 48, preferably increasing in peripheral size from the impact surface 42 to the open end 44 (FIGS. 2B and 3). The number of stepped crush sections 48, the shape, and location thereof can be varied to meet a specific bumper design in order to provide the controlled energy absorption characteristics of the bumper assembly of the present invention to meet various impact conditions.

The crush caps 16 may be attached to the body support members 12 with the attachment flange 46, which preferably is generally perpendicular to an axis along the body support members 12, in abutting relationship with a longitudinal end of the support members 12 and attached thereto in known fashion, for example, with nuts and bolts (FIG. 3). The bumper member 18 is preferably attached, potentially with the same nuts and bolts used to attach the crush caps 16, to an outward end 50 of the body support members 12 so as to encase the crush caps 16 (FIG. 3).

Figure 4B:
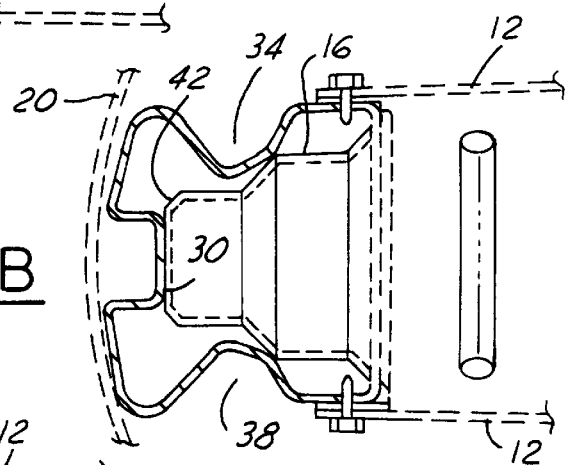

Operation of the bumper assembly according to the present invention will now be described with reference to FIGS. 4A–4B. FIG. 4A, a bumper assembly according to the present invention is shown substantially as described above before an impact force, generally shown at 60, impacts the bumper. Upon initial impact of the force 60, the bumper member 18 deforms about the upper crush groove 34 and the lower crush groove 38 and the crush initiating surface 30 moves toward the outward facing impact surface 42 of a crush cap 16 but does not deform it (FIG. 4B). The deformation of the bumper member 18 about the crush grooves 34, 38 provide a first level of controlled energy absorption caused by an impact force below a first predetermined impact level. This provides the advantage of energy absorption for low impact collisions without the need to replace the crush caps, since no deformation thereof takes place for an impact below the first predetermined impact level.

Figure 4C:
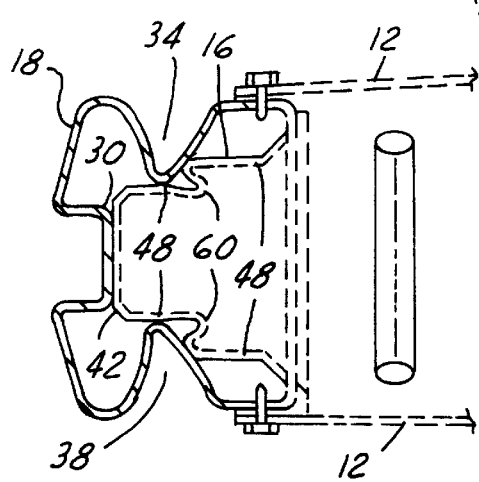

When the bumper assembly is impacted by a force between the first predetermined impact level and a second predetermined impact level, the upper and lower crush grooves 34, 38, respectively, deform and the crush initiating surface 30 of the bumper member 18 contacts the outward facing impact surface 42 of at least one of the crush caps 16 so as to deform it (FIG. 4C). The deformation of the crush cap 16 takes place preferably at transition section 62 between the stepped crush sections 48 (FIG. 4C). The bumper assembly of the present invention thus provides a second level of controlled energy absorption for impacts between the first predetermined impact level and the second predetermined impact level.

Figure 4D:
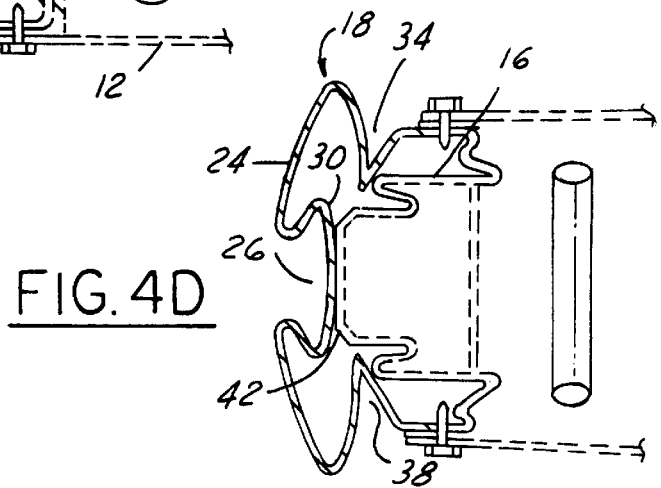

When the bumper assembly is impacted by a force above the second predetermined impact level, the upper and lower crush grooves 34, 38, respectively, deform, the crush initiating surface 30 of the bumper member 18 contacts the outward facing impact surface 42 of at least one of the pair of crush caps 16 deforming it, and the outward facing wall 24 of the bumper member 18 deforms about the outer crush groove 26 inwardly, further deforming the crush cap 16 (FIG. 4D). The bumper assembly of the present invention thus provides a third level of controlled energy absorption for impact forces above the second predetermined level.

Preferably, the bumper member 18 is made of a metal material or metal-plastic combination. The bumper member can roll-formed or extruded. The upper crush groove 34, the lower crush groove 38, and the outer crush groove 26 are generally U-shaped. However, the grooves 26, 34, 38 can be V-shaped, or have any suitable shape which permits deformation as herein described.

Figure 5:
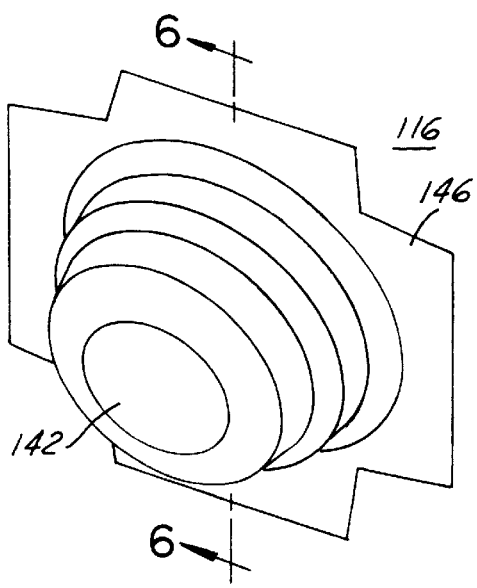
FIG. 5 is a perspective view of a multi-stage crush cap according to an embodiment of the present invention.
Figure 6:
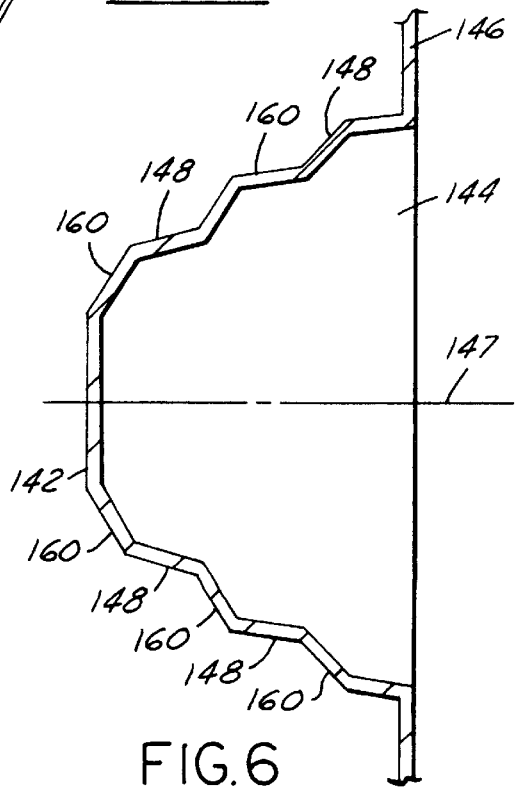
FIG. 6 is a cross-sectional view taken along line 6—6 of FIG. 5.

As seen in FIGS. 5 and 6, one embodiment of a multi-stage crush cap according to the present invention is shown. The crush cap 116 has an outward facing impact surface 142 and a plurality of stepped, crushed sections 148 separated by transition sections 160 (FIG. 6). The crush cap 116 preferably has an attachment flange 146 extending from an open end 144, generally perpendicular to an axis 147. The crush sections 148 can be circularly shaped around axis 147 and preferably increase in peripheral size from the outward facing impact surface 142 to the attachment flange 146 so as to deform telescopically in a fashion similar to that shown in FIGS. 4A–4D. Alternative shapes for the crush sections can take many shapes, including but not limited to ellipsoidal and square shaped. The crush cap 116 can be made of a metal material or of another material suitable for energy absorption.

What is claimed is:

1. A bumper assembly for an automotive vehicle comprising:
   a pair of multi-stage crush caps adapted for attachment to longitudinal ends of a pair of generally parallel, longitudinally extending vehicle body support members, each of the crush caps having an outward facing impact surface;
   a bumper member adapted for attachment to the pair of body support members so as to extend generally laterally therebetween encasing the pair of crush caps therein, the bumper member solely having an upper generally laterally extending crush groove, a lower generally laterally extending crush groove, and an outward facing crush groove extending laterally generally along the bumper member and having an inner crush initiating surface spaced a predetermined distance from and substantially parallel to the impact surface of each of the pair of crush caps; and a bumper fascia adapted to be mounted to the vehicle over the bumper member.

2. A bumper assembly according to claim 1 wherein the bumper member is a hollow beam having a closed cross-section with a pair of inward facing openings adapted to be generally aligned with the body support members for receiving the pair of crush caps therein.

3. A bumper assembly according to claim 1 wherein each of the pair of crush caps has an open end longitudinally opposite the outward facing impact surface.

4. A bumper assembly according to claim 3 wherein each of the pair of crush caps has an attachment flange extending from the open end generally perpendicular to an axis along the body support members for abutting relationship with a longitudinal end thereto.

5. A bumper assembly according to claim 4 wherein each of the pair of crush caps has a plurality of crush sections increasing in peripheral size from the outward facing impact surface to the open end.

6. A bumper assembly according to claim 5 wherein each of the crush sections is generally circularly shaped.

7. A bumper assembly according to claim 1 wherein each of the pair of crush caps is made of a metal material.

8. A bumper assembly according to claim 1 wherein the upper crush groove and the lower crush groove are U-shaped.

9. A bumper assembly according to claim 1 wherein the bumper member is made of a roll-formed metal material.

10. A bumper assembly for an automotive vehicle comprising:
a pair of crush caps adapted for attachment to longitudinal ends of a pair of generally parallel, longitudinally extending vehicle body support members, each of the crush caps having an outward facing impact surface on a first end thereof, an open end with an attachment flange extending therefrom on a second end thereof, and a plurality of stepped crush sections thereinbetween increasing in peripheral size from the first end to the second end;
a bumper member adapted for attachment to the pair of body support members so as to extend generally laterally therebetween encasing the pair of crush caps therein, the bumper member solely having:
an outward facing surface with an outer crush groove extending laterally generally along the bumper member and having an inner crush initiating surface spaced a predetermined distance from and substantially parallel to the impact surface of each of the pair of crush caps;
an upper surface with a generally laterally extending upper crush groove;
a lower surface with a generally laterally extending lower crush groove; and;
an inward facing surface; and
a bumper fascia adapted to be mounted to the vehicle over the bumper member.

11. A bumper assembly according to claim 10 wherein the bumper member is a hollow beam having a closed cross-section with a pair of inward facing openings in the inward facing surface adapted to be generally aligned with the body support members for receiving the pair of crush caps therein.

12. A bumper assembly according to claim 10 wherein the attachment flange on each of the pair of crush caps extends from the open end generally perpendicular to an axis along the body support members for abutting relationship with a longitudinal end thereto.

13. A bumper assembly according to claim 10 wherein each of the crush sections is generally circularly shaped.

14. A bumper assembly according to claim 10 wherein each of the pair of crush caps is made of a metal material.

15. A bumper assembly according to claim 10 wherein the upper crush groove and the lower crush groove are U-shaped.

16. A bumper assembly according to claim 10 wherein the bumper member is made of a roll-formed metal material.

17. A bumper assembly for an automotive vehicle having a pair of generally parallel, longitudinally extending vehicle body support members, the bumper assembly comprising:
a pair of crush caps adapted for attachment to longitudinal ends of body support members, each of the crush caps having an outward facing impact surface on a first end thereof, an open end with an attachment flange extending therefrom on a second end thereof, and a plurality of stepped crush sections thereinbetween increasing in peripheral size from the first end of the second end;
a bumper member adapted for attachment to the pair of body support members so as to extend generally laterally therebetween encasing the pair of crush caps therein, the bumper member solely having:
an outward facing wall with an outer crush groove extending laterally generally along the bumper member, the outer crush groove having an inner crush initiating surface spaced a predetermined distance from and substantially parallel to the outward facing impact surface of each of the pair of crush caps;
an upper wall with a generally laterally extending upper crush groove;
a lower wall with a generally laterally extending lower crush groove; and;
an inward facing wall;
a bumper fascia adapted to be mounted to the vehicle over the bumper member; and
wherein the upper and lower crush grooves deform when the bumper assembly is impacted by a force below a first predetermined impact level and the crush initiating surface of the bumper member move toward the outward facing impact surface of a least one of the pair of crush caps but does not deform said at least one of the crush caps so as to provide a first level of controlled energy absorption;
wherein the upper and lower crush grooves deform and the crush initiating surface of the bumper member contacts the outward facing impact surface of at least one of the pair of crush caps when the bumper assembly is impacted by a force between said first predetermined impact level and a second predetermined impact level deforming said at least one of the crush caps so as to provide a second level of controlled energy absorption; and
wherein the upper and lower crush grooves deform, the crush initiating surface of the bumper member contracts the outward facing impact surface of at least one of the pair of crush caps deforming said at least one of the crush caps, and the outward facing wall of the bumper member deforms about the outer crush groove to further deform the at least one of said crush caps when the bumper assembly is impacted by a force above said second predetermined impact level so as to provide a third level of controlled energy absorption.

18. A bumper assembly according to claim 17 wherein the upper crush groove, the lower crush groove, and the outer crush groove are U-shaped.

19. A bumper assembly according to claim 17 wherein the bumper member is made of a roll-formed metal material.

* * * * *